2,822,244

STABILIZATION OF LIQUID SULFUR TRIOXIDE AND OLEUMS

Richard W. Cornely, Belle Mead, N. J., assignor to E. I. du Pont de Nemours and Company, Wilmington, Del., a corporation of Delaware No Drawing. Application January 3, 1956
Serial No. 556,817

7 Claims. (Cl. 23—174)

This invention relates to liquid sulfur trioxide and high strength oleums that are stabilized against polymerization; and to the stabilization thereof employing sulfamic acid as a polymerization inhibitor.

As is well known, liquid sulfur trioxide exists in three forms having melting points of 17° C., 32.5° C. and 62° C. The polymeric form melting at 62° C., alpha $SO_3$, is the stable form under ordinary conditions. Upon freezing or even after standing at room temperature a short time the liquid gamma form (M. P. 17° C.) ordinarily changes to the solid forms.

This transition of liquid sulfur trioxide to solid polymeric forms is extremely undesirable from the standpoint of ease in handling and usage. In most instances, prior to usage the solidified sulfur trioxide must be remelted by heating to temperatures up to about 100° C., thereby developing dangerous high pressures in some instances.

High strength oleums of free sulfur trioxide strengths upward of about 80% tend to polymerize in a similar fashion. The degree of polymerization depends chiefly upon the sulfur trioxide strength of the oleum and the temperatures at which the material is stored. While polymerization will not proceed sufficiently far in some of these oleums to give a completely solid product, the degree of polymerization increases on the passage of time so that the ultimate mass will ordinarily contain solid forms of $SO_3$ in suspension in the oleum. This polymerization of sulfur trioxide in high strength oleums is also highly undesirable.

I have discovered that liquid sulfur trioxide and oleum of $SO_3$ strength such that $SO_3$ polymers tend to form can be stabilized against the formation of alpha $SO_3$ polymers by incorporating therein a minor amount of sulfamic acid.

The amount of sulfamic acid to be incorporated in the $SO_3$ or oleum will vary with the use for which the $SO_3$-containing product is intended and with the conditions it will be expected to meet. The stabilizing influence of sulfamic acid is proportional to the amount present. In general, it usually is desirable to use only sufficient amount to stabilize the product against substantial polymerization of $SO_3$, although relatively larger amounts of sulfamic acid can be used where the presence of an excess is not objectionable. In most cases it is desirable to use no more than about 10% of sulfamic acid, with from 0.2–5% based on the free $SO_3$ content being the preferred range. The higher percentages ordinarily are employed to stabilize the oleums.

The preferred compositions of this invention consist of liquid sulfur trioxide or oleum containing not more than about 0.1% of water, which materials are stabilized with from 0.2 to 5% by weight of sulfamic acid. Oleum containing not more than about 0.1% of water is, of course, oleum of $SO_3$ strength not less than about 99.4% and sulfuric acid content of not more than 0.56%. These materials high in sulfur trioxide can be stabilized readily so as to resist polymerization even after storage for long periods of time.

The sulfamic acid can be added directly to the liquid sulfur trioxide or oleum to be stabilized, followed by thorough agitation of the liquid. Alternatively, in the case of stabilizing pure liquid sulfur trioxide, $SO_3$ vapor can be condensed in a closed vessel containing the desired amount of sulfamic acid.

Materials stabilized in accordance with my method do not polymerize to the high melting alpha form of $SO_3$ to any appreciable extent. In most instances, they remain substantially in the liquid gamma form at room temperature and lower. After freezing by being cooled to a low temperature, they melt rapidly upon being reheated to about 35° C. Therefore, these products can be used in commercial application either directly without any remelting process whatsoever, or with only a slight heating.

In order that the invention can be better understood, the following examples in addition to those set forth above are given:

Example 1

0.5% by weight of sulfamic acid is added to anhydrous liquid gamma sulfur trioxide with agitation, thereby giving a stabilized liquid sulfur trioxide. This composition, after standing at room temperature for several days, is found to remain liquid. It freezes on cooling to 0° C. and remelts rapidly when heated to 35° C.

Example 2

One percent by weight of sulfamic acid is added to anhydrous liquid gamma sulfur trioxide with agitation. The thusly stabilized liquid sulfur trioxide freezes at 0° C. and remelts readily upon heating to 35° C. After standing at room temperature for several days, this composition shows no tendency toward $SO_3$ polymerization and solidification.

Example 3

1.5% of sulfamic acid is added with agitation to oleum of $SO_3$ strength of 99.5%. After standing at room temperature for several days, the thusly stabilized oleum remains in the liquid form.

Example 4

Five percent by weight of sulfamic acid is added to oleum of 99.7% $SO_3$ strength. Upon standing for 72 hours at room temperature, the thusly stabilized oleum remains in the solid state.

I claim:

1. The method of stabilizing against $SO_3$ polymerization a compound selected from the group consisting of liquid sulfur trioxide and oleum of $SO_3$ strength such that $SO_3$ polymers tend to form comprising incorporating therein about 0.2 to 5% by weight based on $SO_3$ content of sulfamic acid.

2. The method of stabilizing liquid sulfur trioxide containing not more than 0.1% of water against $SO_3$ polymerization comprising incorporating therein about 0.2 to 5% by weight based on $SO_3$ content of sulfamic acid.

3. The method of stabilizing liquid sulfur trioxide against $SO_3$ polymerization comprising incorporating therein about 0.2 to 5% by weight based on $SO_3$ content of sulfamic acid.

4. A composition containing a material selected from the group consisting of sulfur trioxide and oleum of $SO_3$ strength such that $SO_3$ polymers tend to form in admixture with sulfamic acid in an amount up to 10% by weight based on $SO_3$ content.

5. A composition comprising a material selected from the group consisting of sulfur trioxide and oleum of $SO_3$ strength such that $SO_3$ polymers tend to form, and about 0.2 to 10% by weight based on $SO_3$ content of sulfamic acid.

6. A composition comprising liquid sulfur trioxide containing not more than 0.1% of water and between about 0.2 and 5% by weight based on $SO_3$ content of sulfamic acid.

7. The method of stabilizing against $SO_3$ polymerization the material selected from the group consisting of sulfur trioxide and oleum of $SO_3$ strength such that $SO_3$ polymers tend to form comprising incorporating therein sulfamic acid in an amount up to 10% by weight of the $SO_3$ content.

References Cited in the file of this patent

UNITED STATES PATENTS 2,513,549  Clark et al. _____ July 4, 1950

OTHER REFERENCES

Chem. Abs., 48 pages, 8689d, 1954.